3,001,727
FLOUR MILLING PROCESS
Zenas Block, Larchmont, and Walter H. Harte, White Plains, N.Y., and James F. Walsh, Daytona Beach, Fla., assignors to DCA Food Industries Inc., New York, N.Y., a corporation of New York
Filed Nov. 20, 1957, Ser. No. 697,717
2 Claims. (Cl. 241—9)

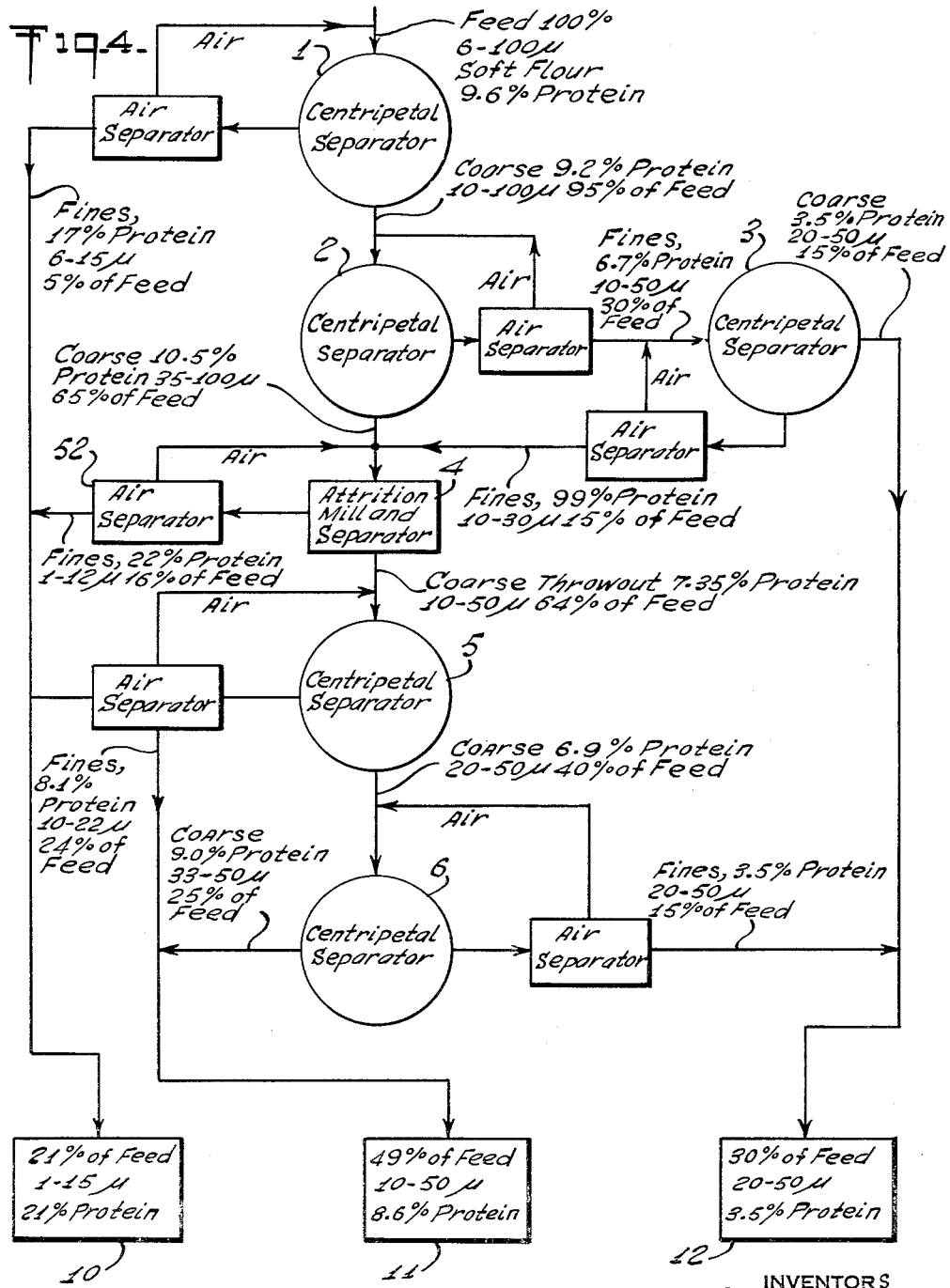

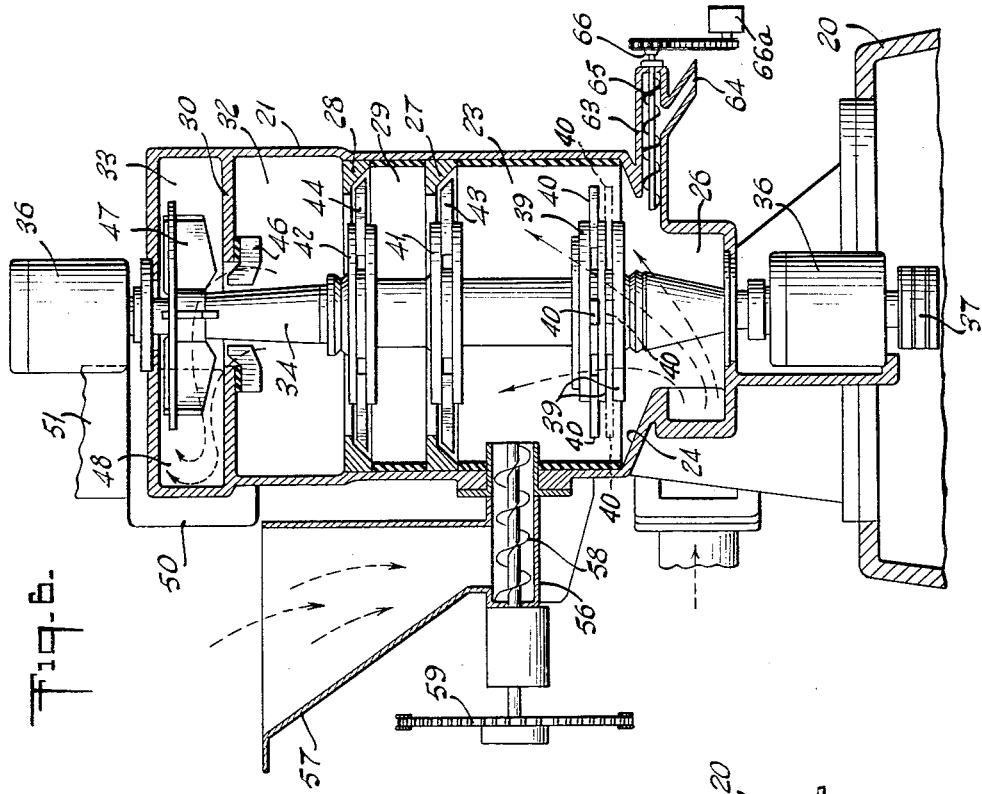
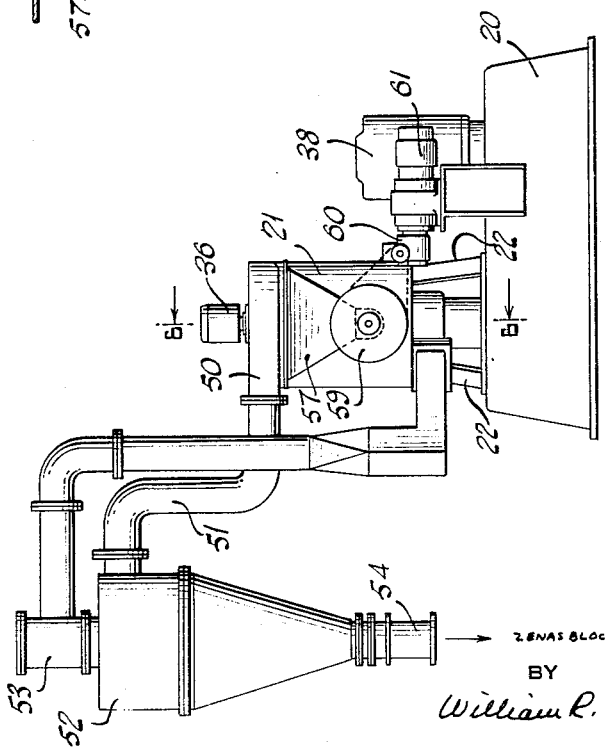

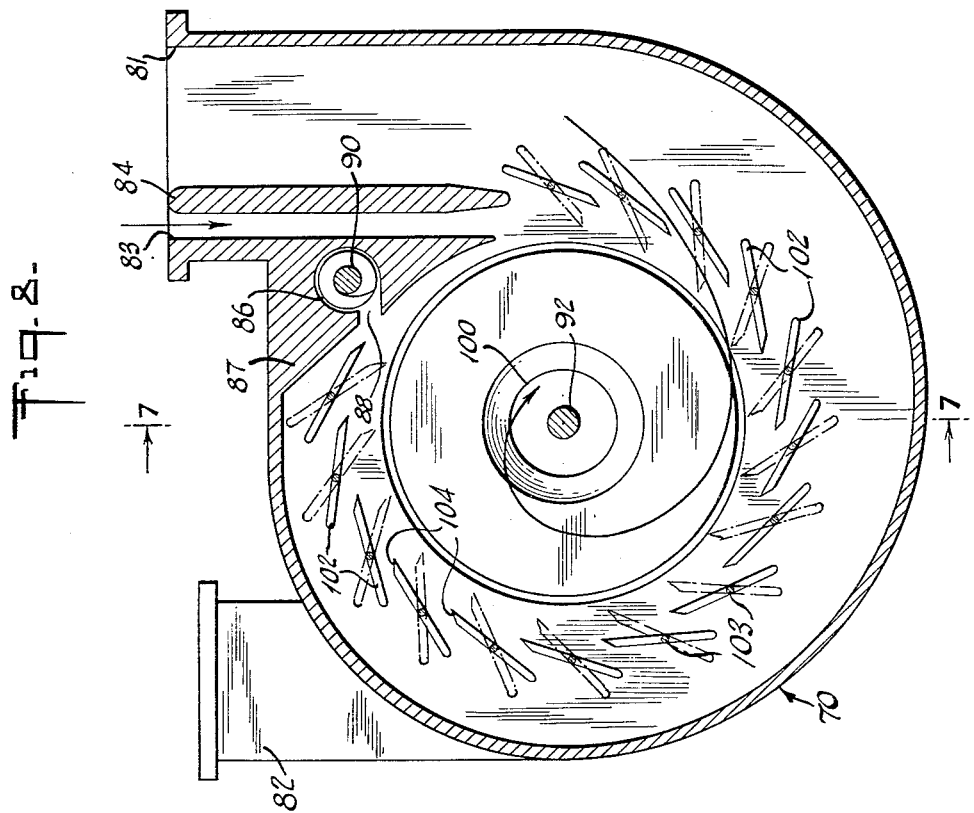
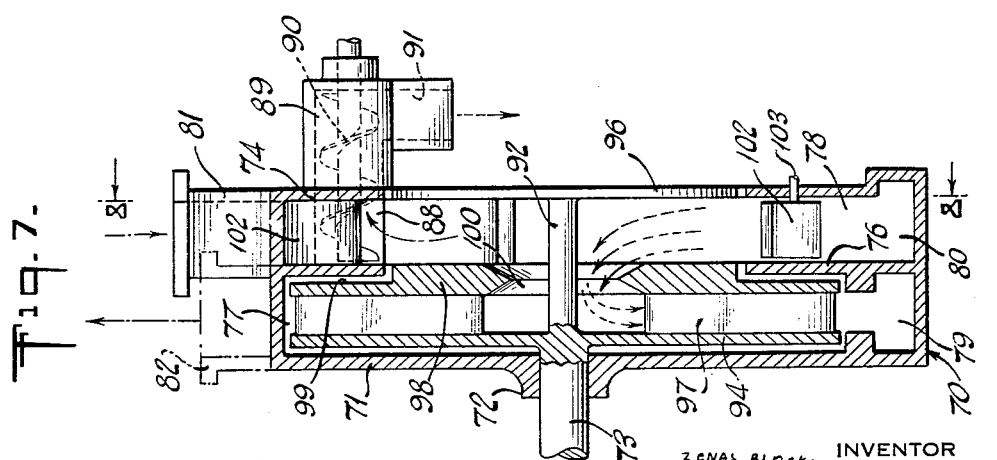

The present invention relates generally to an improved process for the production of flour, and it relates more particularly to an improved flour milling process.

The principal function of the milling of wheat to produce flour is the separation of the endosperm from the husk and germ of the wheat berry. This is generally done by breaking the berries and separating the bran from the endosperm and subjecting the endosperm particles to successive reductions, siftings and purifications to reduce the endosperm to flour and separate the bran and germ. Conventionally, the wheat is first cleaned and conditioned and fed to a set of corrugated break rolls the discharge of which is passed through a series of sieves from which the topmost tailings are fed to a successive finer break roll, the intermediate semolina and middlings to purifiers and reduction rolls and the throughs to the clear stream. There are usually three to five break rolls fed in succession as aforesaid. There are likewise several sets or rolls, eight in the popular Hungarian system, each having a purifier at its feed end and a sifter gang at its discharge end.

The throughs of the sifters and purifiers form flour of various compositions whereas the tailings and middlings are conveyed to further processing or discharged as a bran or feed. There are thus a plurality of streams emerging from the mill which are mixed in the desired manner to produce straight flour, patent flour, clears, feed of various compositions, etc. The composition and baking properties of the end product are dependent, for practical purposes, only to a slight degree on the milling procedure and to a major extent on the type of wheat being processed. The flour from the various streams differ little in their protein or gluten content, those with maximum protein content either being present in very low percentages or containing an excess of undesirable ash indicative of the presence of bran.

In the production of baked products, a high gluten, low bran content flour is required for bread and other yeast raised products, whereas a relatively low gluten flour is desirable for cakes, cookies, biscuits and other chemically leavened products. In the conventional milling processes the composition of the flour and its usefulness for bread or cake are determined for the most part by the kind of wheat being milled and only to a minor extent on the milling procedure. Thus, a soft wheat will not produce a satisfactory bread flour because of its low protein level whereas its produces a highly satisfactory cake flour. A hard wheat, on the other hand, being high in gluten, produces a satisfactory bread flour. The protein content of wheat, depending on the species, source and other conditions, varies between about 8% and 15% and the protein content of commercial flours varies between 8% and 14%. The wheat endosperm contains, in addition to the protein which serves as a cementing matrix, a major portion of starch in the form of granules having diameters of between 2 microns and 50 microns, the majority of granual sizes being at opposite ends of the spectrum with very few in between.

In milling the flour, rupture or breaking of the starch granules adversely affects the properties of the flour. The protein is dispersed throughout the endosperm, being more concentrated at the surface thereof adjacent to the husk. The particle size of the commercial flours generally ranges between about 15 and 150 microns.

It is apparent from the above that the conventional milling process is highly inflexible providing a flour whose optimum characteristics and use are determined by the wheat feed. Moreover, the equipment employed, particularly in the breaking, reducing, sifting and purifying steps is extensive and complex, requiring critical adjustments and being highly power consuming.

An analysis of the protein and ash content of flours in accordance with the particle size indicates that the protein and ash content vary to a limited degree, with the particle size. By taking advantage of this protein and ash distribution these components of the flour may be increased or diminished, but only to a very limited extent and in a interdependent nature.

It is thus a principal object of the present invention to provide an improved process for the production of flour.

Another object of the present invention is to provide an improved process for the milling of flour.

A further object of the present invention is to provide an improved process for the milling of flour capable of substantially enhancing and impoverishing selected fractions of the flour.

Still a further object of the present invention is to provide an improved process for the milling of flour capable of producing from a low protein wheat a high protein flour suitable for the production of bread and other yeast raised products.

Another object of the present invention is to provide an improved process for the milling of flour, said process being characterized by its great versatility and flexibility.

Still another object of the present invention is to provide an improved method for the milling of flour characterized by the use of standard equipment.

The above and other objects of the present invention will become apparent from a reading of the following description, taken in conjunction with the accompanying drawings, wherein:

FIGURE 4 is a flow diagram illustrating an example of the method of processing soft wheat flour in accordance with the present invention;

FIGURE 5 is a front elevational view of a mill classifier employed in practicing the present invention;

FIGURE 6 is a detail sectional view taken along line 6—6 in FIGURE 5;

FIGURE 7 is a transverse sectional view of an aerodynamic particle classifier employed in the present process; and FIGURE 8 is a sectional view taken along line 8—8 in FIGURE 7.

Figure 1:
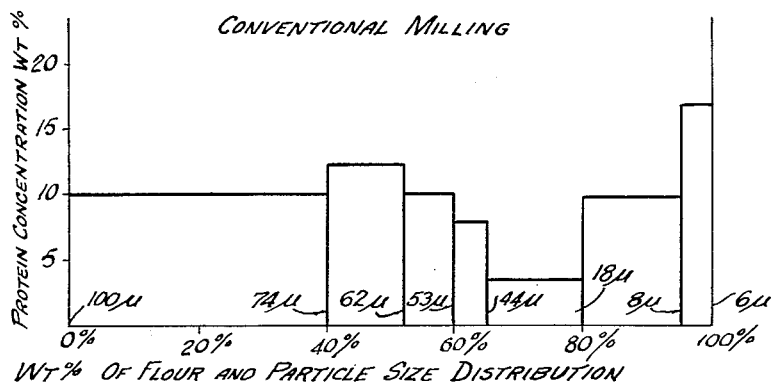
FIGURE 1 is a graph illustrating the protein versus particle size distribution in conventionally milled soft wheat flour.

The present invention is based on the discovery that when airborne fragments of a cereal endosperm are circulated in a closed path and comminuted while so circulated, finely comminuted particles being continuously separated from the main stream and coarse particles being continuously separated from the main stream at a predetermined rate relative to the feed of the endosperm fragments into the stream, the fine particles are enriched in their protein content to a degree not heretofore experienced or obtainable by the conventional milling process. The present invention therefore contemplates an improved process for the milling of flour comprising circulating airborne fragments of a cereal endosperm in a closed path; comminuting said airborne fragments; continuously removing fine comminuted particles below a predetermined size from said closed path; continuously introducing cereal endosperm fragments into said closed path at a predetermined rate of feed; and continuously withdrawing coarse particles at a predetermined rate from said closed path, said fine particles having a higher protein concentration than said coarse particles.

The comminuting of the endosperm fragments is effected by interparticle attrition or by air attrition of the fragments. The separation of the fine particles from the main recirculating stream is accomplished aerodynamically, as will be herinafter set forth. The fine particles as well as the coarse particles are thereafter further subjected to a fine aerodynamic classification and the classified particles are either further processed or discharged in accordance with their characteristics and admixed with other streams to form the protein enriched and the protein impoverished flour fractions.

In practicing the present improved method there were employed an attrition mill and air classifier known as the Raymond vertical mill which is provided with a cyclone separator and is produced by the Raymond Division of Combustion Engineering, Inc., and an aerodynamic air separator known as the Mikroplex spiral air classifier, which is produced by the Alpine Company of Augsburg, Germany. A description of the above apparatus and their operation will be hereinafter set forth. It should be pointed out that equipment of a similar nature may be employed where such equipment effects the novel process steps. The mill is characterized in that it causes a circulation of the treated material, continuously removing particles below a predetermined size therefrom and continuously removing coarse particles at a predetermined rate. During the circulation of the treated material it is subjected principally to an interparticle attrition and air particle attrition. The spiral air classifier is a vortex type separator in which a sharp cut and an adjustable fine cut size may be achieved.

The following procedure is given merely by way of example in the treatment of straight flour derived from soft wheat, it being understood that the process may be varied over wide ranges to employ as starting material a hard wheat flour, middlings, semolina, or other material derived from various sources and that the composition of the end product may be varied by suitable adjustment and arrangement of the equipment, as will become apparent to those skilled in the art.

As an example of the present process as applied to the treatment of flour derived from soft wheat, a straight flour having a 9.6% protein and an 0.42% ash content and a particle size range of between 6 and 100 microns was employed. The flour was derived from a conventional Hungarian system type flour mill in which the flour derived from the major streams possessed the following analysis:

*Flour mill stream analyses*

| Major Mill Streams | Approx. Wt. Percent of Total Flour | Protein, Percent | Ash, Percent |
| --- | --- | --- | --- |
| 2nd Break | 5 | 7.10 | 0.372 |
| 3rd Break | 5 | 8.53 | 0.352 |
| Sizings | 14 | 8.12 | 0.43 |
| 1st Middlings | 20 | 8.38 | 0.34 |
| 2nd Middlings | 18 | 9.33 | 0.33 |
| 3rd Middlings | 8 | 9.65 | 0.35 |
| 4th Middlings | 6 | 9.89 | 0.42 |
| 4th Break | 5 | 8.98 | 0.42 |
| 5th Middlings | 5 | 10.02 | 0.44 |
| Others | 14 | | |

The comminuting and classifying apparatus was arranged and connected in a manner illustrated in FIGURE 4 of the drawing, the classifiers being the Mikroplex air classifier above-identified including a cyclone air separator, and the attrition mill being the Raymond vertical mill, including the separating system associated therewith, likewise above-identified. The straight soft wheat flour, as above set forth, is fed into a first classifier 1 adjusted to a nominal cut off point at about 13 microns. The fines from the classifier 1 are directed to an outlet stream 10 and the coarse from the classifier 1 is fed to the inlet of a second classifier 2. The classifier 2 is adjusted to a nominal cut point of about 42 microns. The fines from the air classifier 2 are fed to a third air classifier 3 and the coarse from the air classifier 2 are fed to an attrition mill 4. The air classifier 3 is adjusted to a nominal cut off point of about 25 microns. The coarse from the classifier 3 is delivered to a discharge stream 12 and the fines are fed to the attrition mill 4. It should be noted that the blade settings given in the following table are the calibration indications employed on the aerodynamic air classifying device hereinafter described in detail and specifically identified, and effect the correspondingly specified cut-off points.

The attrition mill 4, a Raymond vertical mill, includes upper and lower rotating arms which effects a classification of the circulating airborne material and a set of mill arms which effects the attrition of the circulating material in a manner as will be hereinafter set forth in greater detail. There are provided twelve lower classifying arms, twenty-four upper classifying arms and four upper mill arms. The scalping or throwout mechanism was adjusted to remove 80% of the material fed to the mill 4. The fines from the attrition mill 4 are delivered to the discharge stream 10, whereas the throwout is fed to a fourth air classifier 5, the blades of which are set to produce a nominal cut off point of about 21 microns. The fines from the air classifier 5 are delivered to a discharge stream 11 and the coarse to a fifth air classifier 6 adjusted to a nominal cut off point of about 34 microns. The coarse from the air classifier 6 is fed to the discharge stream 11 and the fines to the discharge stream 12.

The following table sets forth the protein and ash content, particle size range and weight percentage of the various streams in the above-described process as applied to the aforesaid soft wheat flour:

| Step | Machine and Approximate Settings | | Percentage of Original Feed | Percentage Protein | Percentage Ash | Particle Size, Microns |
|---|---|---|---|---|---|---|
| 1 | Air Classifier 1—Blades set at 30 | Feed—Straight Soft Flour | 100 | 9.6 | 0.42 | 6–100 |
| | | Fines—To High Protein Product Stream 10 | 5 | 17.0 | 0.72 | 6–15 |
| | | Coarse—To Air Classifier 2 | 95 | 9.2 | 0.40 | 10–100 |
| 2 | Air Classifier 2—Blades set at 45 | Feed—Coarse from Air Classifier 1 | 95 | 9.2 | 0.40 | 10–100 |
| | | Fines—To Air Classifier 3 | 30 | 6.7 | 0.40 | 10–50 |
| | | Coarse—To Attrition Mill 4 | 65 | 10.5 | 0.40 | 35–100 |
| 3 | Air Classifier 3—Blades set at 35 | Feed—Fines From Air Classifier 2 | 30 | 6.7 | 0.40 | 10–50 |
| | | Fines—To Attrition Mill 4 | 15 | 9.9 | 0.47 | 10–30 |
| | | Coarse—To Low Protein Product Stream 12 | 15 | 3.5 | 0.33 | 20–50 |
| 4 | Attrition Mill 4—12 Bottom Classifier Arms 43; 24 Top Classifier Arms 44; 4 Top Mill Arms 40; 0 Bottom Mill Arms 40 (Figure 6 of Drawings). | Feed—Coarse from Air Classifier 2 and Fines from Air Classifier 3. | 80 | 10.4 | 0.42 | 10–100 |
| | | Fines—To High Protein Product Stream 10 | 16 | 22.0 | 0.70 | 1–12 |
| | | Coarse To Air Classifier 5 | 64 | 7.35 | 0.35 | 10–50 |
| 5 | Air Classifier 5—Blades Set at 32 | Feed—Coarse Throwout from Attrition Mill 4 | 64 | 7.35 | 0.35 | 10–50 |
| | | Fines—To Mid-Protein Product Stream 11 | 24 | 8.1 | 0.40 | 10–22 |
| | | Coarse—To Air Classifier 6 | 40 | 6.9 | 0.32 | 20–50 |
| 6 | Air Classifier 6—Blades set at 40 | Feed—Coarse from Air Classifier 5 | 40 | 6.9 | 0.32 | 20–50 |
| | | Fines—To Low Protein Product Stream 12 | 15 | 3.5 | 0.30 | 20–35 |
| | | Coarse—To Mid-Protein Product Stream 11 | 25 | 9.0 | 0.33 | 33–50 |

The high protein stream 10 constitutes 21% by weight of the original feed and has a protein content of 20.7%. The discharge stream 11 constitutes 49% by weight of the original feed and has an 8.6% protein content, whereas the discharge stream 12 constitutes 30% by weight of the original feed and has a 3.5% protein content.

The flour fractions derived from the various streams being of different composition and characteristics are best suited for different purposes. Thus, the high protein flour of the discharge stream 10 may be used in breads, sweet doughs, yeast raised doughnuts, high protein foods and may be employed in the protein enrichment of low protein flours to permit their use in breads and other yeast raised products. The medium protein flour fraction derived from the discharge stream 11 may be used for cake doughnuts, cakes, family flours and the like whereas the low protein flour fraction derived from discharge stream 12 may be used for cakes, crackers, cookies, waffles, pancakes, etc. It should be pointed out that the various streams may be mixed as desired or otherwise treated to achieve flours of various desired characteristics. Moreover, the cut point of the air classifiers may be varied as well as the comminuting action of the mill and the percentage of throwout.

It has been found that by varying the percent of throwout of the mill the protein distribution is varied. While the throwout may be dispensed with, it is preferable to employ the mill throw so that between 15 and 85% of the feed is removed by the throwout and the fines fraction has a particle size below 30 microns. The use of the throwout is highly desirable in that an increase in overall capacity is effected with a similar protein enrichment effect, the classifier capacity requirments are reduced, there is a reduction in the tendency to overcomminute the flour which may result in a rupturing of the starch granules thereby reducing the flour quality and there is a reduction in the tendency to overheat the flour. If no throwout is employed and the input to the mill 4 is the 35–100 micron fraction of conventional soft wheat flour constituting 80% of the original weight and the mill is adjusted so that the output is in the 3–40 micron range, the output may be aerodynamically separated as above into a fine fraction of 3–21 microns constituting 35% of the feed and having a 20% protein content and a coarse fraction of 15–40 microns constituting 65% of the feed and having a 5.8% protein content.

Figure 2:
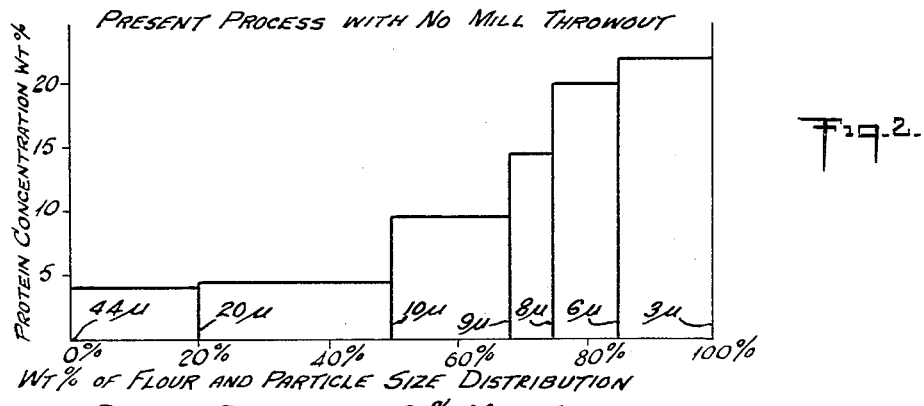
FIGURE 2 is a graph illustrating the protein versus particle size distribution of a soft wheat flour subjected to attrition comminuting of a type employed in the present invention, the attrition mill having its throwout mechanism deactivated as will be hereinafter set forth.
Figure 3:
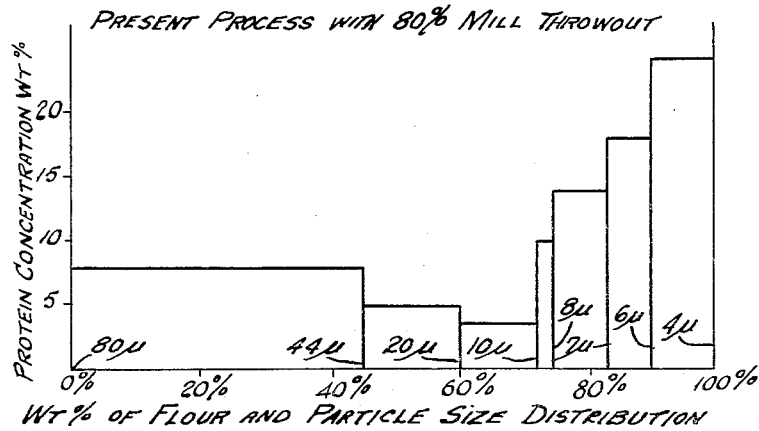
FIGURE 3 is a graph of the protein versus particle size distribution of a soft wheat flour subjected to the method of attrition in accordance with the present invention, the throwout mechanism of the attrition mill being adjusted to 80% throwout as will be hereinafter set forth.

In FIGURES 1 to 3 of the drawing there are illustrated the protein concentration distribution graphs of various flour fractions in accordance with the particle size of the flour fractions and the percentage of the total flour of each of these fractions, in FIGURE 1 in the case of a straight soft flour of the type treated in accordance with conventional milling practice; in FIGURE 2 said flour treated in the attrition mill above-identified and adjusted as above set forth with no throwout; and as illustrated in FIGURE 3 in the same mill similarly adjusted except that the throwout is activated so as to discharge 80% of the feed. It should be noted that in the conventionally milled flour the fraction having a particle size range between approximately 44 and 100 microns constitutes approximately 65% of the flour and averages approximately 10% protein. The fraction between about 18 and 44 microns has about 3½% protein and constitutes about 15% of the flour. The fraction between 8 and 18 microns particle size contains approximately 10% protein and constitutes 15% of the flour and the fraction between 6 and 8 microns accounts for the remaining 5% of the flour and has a protein content of approximately 17%.

When the flour is treated in a comminuting mill, adjusted in the manner employed in the above example, and the throwout mechanism inactivated, a radical redistribution of the protein is effected. Approximately 25% of the flour is in the 3 to 8 micron particle size range and has a protein content between 20 and 22%; about 6½% of the flour is in the 8 to 9 micron particle size range and has a protein content of approximately 14½%; 18% of the flour is within the 9 to 10 micron particle size range and has a protein content of about 9½%; and the remaining 50% of the flour is within the 10 to 44 micron range and has a protein content of approximately 4%. When the throwout is activated so that the discharge rate thereof is about 80% of the feed rate of the flour to the mill, a protein redistribution is effected in which the flour fraction in the 4 to 6 micron range constitutes 10% of the flour and has a protein content of 24%; the 6 to 8 micron range constitutes about 16% of the flour and has a protein content between 14 and 18%; and about 2% of the flour is in the 8 to 10 micron range and has a protein content of approximately 10%. The flour fraction within the 10 to 44 micron range constitutes about 27% of the flour and has a protein content between 4 and 5%, and the remaining 45% of the flour is within the 45 to 80 micron particle size range and has a protein content of 8%.

It should be noted that the protein distribution curves of the flour milled in the comminuting mill without the throwout and with the throwout have different overall shapes. Where the throwout is not employed the protein concentration increases at a somewhat uniform rate inversely as the particle size, whereas where the throwout is employed the protein concentration decreases with the decrease in the particle size from 80 to 10 microns and thereafter increases sharply from the 10 to 4 micron particle size range. The protein distribution of the various flour fractions where the throwout is employed permits, for practical purposes, a range of blending and a versatility no less than that afforded when the throwout is inactivated. However, the use of the throwout is accompanied by the many advantages previously set forth.

Referring now to FIGURES 5 and 6 of the drawings which illustrates the comminuting mill and the associated cyclone separator employed therewith in the present process, the numeral 20 generally designates a base member supporting the mill main housing 21 upon a plurality of legs 22. The housing 21 is of vertical cylindrical configuration including a lower or milling compartment 23 communicating by way of an inclined funnel-shaped wall 24 with a lower or air feed compartment 26. A pair of vertically spaced rings 27 and 28 respectively are carried by the wall of the housing 21 above the lower compartment 23 to delineate a lower intermediate compartment 29. An annular flange 30 is directed inwardly from the wall of the housing 21 above the upper ring 28 to define the upper wall of an upper intermediate compartment 32 and the lower wall of an air impeller compartment 33. The upper and lower end walls of the housing 21 have aligned axial openings formed therein through which project the upper and lower ends of a main shaft 34. Suitably mounted water cooled bearings 36 rotatably support the shaft 34, the lower end of the shaft 34 carrying a pulley 37 which is connected by way of a drive belt to a corresponding pulley carried on the drive shaft of a main drive motor 38 mounted on the base 20.

Carried by the shaft 34 in the compartment 23 directly above the inclined wall 24 are three vertically spaced hub discs 39 which carry between their opposing faces removable circumferentially spaced, radially projecting mill arms 40 which extend to a point short of the wall of the housing 21, the lower of the mill arms 40, shown in broken line, being removed in the specific example given above. Lower and upper pairs of vertically spaced hub discs 41 and 42 respectively are mounted on the shaft 34 and are substantially coplanar with the rings 27 and 28. Each pair of hub discs 41 and 42 removably support circumferentially spaced, radially projecting lower and upper classifier arms 43 and 44, the end faces of which are downwardly outwardly inclined and are slightly spaced from and confront the parallel faces of the respective rings 27 and 28. In the example of the improved process set forth above there are provided four upper regularly, circumferentially spaced upper mill arms 40 and no lower mill arms 40, and there are provided twelve lower classifier arms 43 and twenty-four upper classifier arms 44.

In FIGURE 6 of the drawings, the normal position of the removed bottom mill arms 40 is illustrated in broken lines.

Carried along the lower inner border of the annular partition 30 are a plurality of vertical, stationary guide vanes 46 the inner ends of which are spaced from the surface of the shaft 34. Disposed in the compartment 33 and carried on the shaft 34 is an impeller 47 of conventional structure. Formed in the peripheral wall of the upper compartment 33 is an exit opening 48 affording entry into a tangentially extending conduit 50 which is connected by suitable ducts 51 to the inlet of a cyclone air separator 52 of any well known construction. The cyclone separator 52 is provided with an upper axial air outlet pipe 53 which is connected by way of suitable duct work to the mill air feed compartment 26. A discharge pipe 54 communicates with the bottom of the cyclone separator 52, the flour emerging therefrom being delivered for further processing as desired.

Supported on the housing wall 21 and passing through the wall thereof into the upper part of the comminuting compartment 23 is a feed pipe 56 provided with a communicating feed hopper 57. Extending axially of the feed pipe 56 is a feed screw or worm 58 having a shaft projecting rearwardly through an outer end wall of the feed pipe 56 and carrying a sprocket wheel 59. The sprocket wheel 59 in turn is connected by way of a sprocket chain to the shaft of a variable speed reducing unit 60 driven by a motor 61 mounted on the base 20. The throwout mechanism includes a tube 63 entering the lower portion of the comminuting compartment 23 through an opening in the inclined wall 24 below the communicating arms 40 and is provided with a depending discharge pipe or spout 64. A screw 65 extends along the length of the tube 63 and is provided at its outer end with a sprocket wheel 66 connected to a variable speed drive 66a by means of a suitable sprocket chain.

In operation, the shaft 34 is driven at a high speed by means of the drive motor 38. The impeller 47 circulates air through the opening in the air feed compartment 26 upwardly through the housing 21 and thence outwardly through the duct 51. The air emerging from the duct 51 travels tangentially into the cyclone separator 52 to form a vortex therein, the air emerging through the duct 53 and returning to the compartment 26. The solid material carried by the air stream entering the cyclone separator 52 drops through the lower duct 54. The comminuting arms 40 impart a high circular motion to the air within the compartment 23 which effects a comminution of any particles carried in the air stream, principally by interparticle attrition and air particle attrition. The material to be comminuted is delivered by way of the hopper 57, feed tube 56 and worm 58 into the upper part of the comminuting compartment 23 where it drops into the comminuting zone at the lower part of the compartment. The fine particles, either delivered to the compartment 23 or produced by the comminuting action therein, are carried by the upward flow of the air through the spaces between successive rotating classifying blades 43 and 44. The centrifugal force imparted to the fine particles is insufficient to divert them from their upward passage between the blades 43 and 44. However, the heavier particles having a greater centrifugal force imparted thereto relative to the upward drag of the air are carried outwardly and drop downwardly to be eventually returned to the comminuting compartment 23. Thus, the airborne particles are recirculated in a closed path, those particles below a predetermined size passing upwardly and outwardly and the heavier particles being returned to the comminuting zone. The fine particles which pass between the successive blades 43 and 44 are carried upwardly and discharge through the opening in the impeller compartment 33 from which they are carried to the cyclone separator 52 separated from the transporting air and discharged through the conduit 54. The coarse particles, on the other hand, are removed from the compartment 23 by the throwout mechanism including the worm 65. The ratio between the feed rate and the coarse discharge rate may be adjusted to any desired value.

The air classifier employed in the example of the process set forth above is illustrated in FIGURES 7 and 8 of the drawings and includes a relatively shallow cylindrical body member or housing 70 having an end wall 71 provided with a centrally located apertured boss 72 through which extends an impeller drive shaft 73 driven at a high velocity by a conventional motor. The housing 70 is divided into two sections by an inwardly directed outer annular flange 74 and an inwardly directed intermediate annular flange 76, the two resulting sections defining an impeller housing 77 and a separating compartment 78 respectively. It should be noted that the housing 70 includes volutes 79 and 80 communicating peripherally with the compartments 77 and 78 respectively.

Formed integrally with the housing 70 is a first tangentially disposed duct 81 which communicates with the separator compartment 78 and an outlet duct 82 communicating with the impeller compartment 77 and tangential thereto. A feed passageway 83 is formed along the inner wall of the duct 81 and is separated from the remainder of the duct by an integrally formed wall 84. An axially extending cylindrical cavity 86 is formed in the enlarged wall 87 of the housing 70 which is disposed within the separator compartment 78 adjacent to the feed passageway 83, the cavity 86 having a transverse entrance slot 88 formed therein which slot is directed tangentially in a counterclockwise direction, as seen in FIGURE 8 of the drawing, relative to the axis of the housing at a point spaced radially outwardly of the inner edge of the flange 76. A conduit 89, in alignment and communicating with the cavity 86, is provided with a worm 90 extending for the length of the conduit 89 and the cavity 86. The worm 90 is driven by any suitable means so that any material lodging in the cavity 86 is transported into the conduit 89 and discharged through a spout 91.

A shaft 92 of reduced cross section extends coaxially from the main shaft 73 and carries at its inner end a disc 94 which closely confronts the inner face of the housing end wall 71 and at its outer end a disc 96 coplanar with the flange 74 and extending substantially to the inner edges of said flange 74. A plurality of radially extending impeller blades 97 of conventional configuration are mounted on the inner face of the disc 94 and extend to a point short of the shaft 92. An annular member 98 is secured to the edges of the impeller blades 97 opposite the disc 94 and is provided with an annular step 99 in its outer face registering with the flange 76. The central opening 100 formed in the annulus 98 is provided with oppositely directed beveled edges.

A plurality of axially extending circumferentially spaced vanes 102 are disposed within the classifying compartment 78 and are provided with shafts 103 passing through corresponding openings formed in the outer flange 74. The vanes 102 are provided with sharp downstream edges 104 and are directed inwardly in a clockwise direction as illustrated in FIGURE 8 of the drawing. The angles of the blades 102 with the circumference of the housing are concurrently adjustable, as shown in broken line, by any suitable means engaging the blade shafts 103.

The cut off point; that is, the particle size above and below which separation is effected, may be varied by adjusting the angles of the blades 102. The outlet conduit 82 is connected to an air or dust separator of any conventional type, for example, a cyclone separator, the air outlet of which is connected to the inlet conduit 81.

In operation, the impeller is rotated at a high velocity by way of the shaft 73 so that the air entering the classifier by way of the conduit 81 travels along a helical path directed by the blades 102 through the central opening 100, the air thence being discharged by the duct 82 to the air separator. The feed material is fed through the passageway 83 and is likewise transported in a helical path by the vortex produced in the separator compartment 78. The cut off point is determined by the equilibrium between the centrifugal force imparted to the airborne particles and the inward air drag of the vortex. Where the centrifugal force is greater than the drag of the air tending to carry the particles through the opening 100, as is the case of particles above a predetermined size, these particles will traverse a path of relatively large radius and be carried through the slot 88 and transported to the discharge spout by the worm 86. In the case of the finer particles, on the other hand, the air drag is greater than the centrifugal force so that these particles traverse a path of decreasing radius which carries them through the opening 100 and through the discharge duct 82.

It should be understood that other classifiers and mills may be employed in the place of those described above. It is important, however, that the mill be of the type which effects an attrition of the airborne particles in the manner previously described.

While there has been described and illustrated a preferred embodiment of the present invention, it is apparent that numerous alterations and omissions may be made without departing from the spirit thereof.

We claim:

1. An improved process for the milling of flour comprising recirculating airborne fragments of a cereal endosperm in a closed path, comminuting said fragments while airborne, continuously removing substantially all of the fine comminuted particles below a predetermined size from said closed path, continuously introducing cereal endosperm fragments into said closed path at a predetermined rate of feed, and continuously withdrawing coarse particles at a predetermined rate from said closed path, said fine particles having a higher average protein concentration than said coarse particles and defining a main constituent of the high protein finished product stream of said milling process, said fine particles not exceeding substantially 12 microns in size, the ratio of the rate of withdrawal of said coarse particles to said rate of feed being approximately 80:100.

2. An improved process for the milling of flour comprising recirculating airborne fragments of a cereal endosperm in a closed path, comminuting said particles while airborne, continuously removing substantially all of the fine comminuted particles below a first predetermined size from said closed path, continuously introducing cereal endosperm fragments into said closed path at a predetermined rate, continuously withdrawing coarse particles at a predetermined rate from said closed path, said fine particles having a higher average protein concentration than said coarse particles, subjecting said withdrawn coarse particles outside said closed path to an aerodynamic classification thereby to separate said coarse particles into a coarse fraction and a fine fraction above and below a second predetermined particle size, and subjecting said coarse fraction to an aerodynamic classification to separate the particles therein into coarse and fine subfractions above and below a third predetermined particle size greater than said first predetermined particle size, said fine comminuted particles removed from said closed path entering a first mill stream having a high protein content and said coarse subfraction having an intermediate protein concentration approximating that of said cereal endosperm and entering a second mill stream.

References Cited in the file of this patent

UNITED STATES PATENTS

| | | |
|---|---|---|
| 1,535,120 | Kanowitz et al. | Apr. 28, 1925 |
| 1,943,817 | Dunton | Jan. 16, 1934 |
| 2,200,822 | Crites | May 14, 1940 |
| 2,381,351 | Hardinge | Aug. 7, 1945 |
| 2,464,212 | Carter | Mar. 15, 1949 |
| 2,501,622 | Smith | Mar. 21, 1950 |
| 2,509,919 | Gruender | May 30, 1950 |
| 2,561,388 | Lykken et al. | July 24, 1951 |
| 2,561,564 | Crites | July 24, 1951 |
| 2,651,470 | Dodds | Sept. 8, 1953 |
| 2,752,097 | Lecher | June 26, 1956 |
| 2,774,476 | Doyle | Dec. 18, 1956 |
| 2,846,151 | Wehn et al. | Aug. 5, 1958 |
| 2,883,309 | Bernheim | Apr. 21, 1959 |

FOREIGN PATENTS

| | | |
|---|---|---|
| 640,561 | Great Britain | July 26, 1950 |

OTHER REFERENCES

Flour Milling Processes, by J. E. Scott, 1951, published by Chapman and Hall, Limited, 39 Essex St., W.C. 2, London, England, pages 409 to 411.

German Report on the "Internationaler Brotkongress, Hamburg, 1955, pages 154–157, Conference May 22–27, 1955.

Der Mikroplex-Spiralwindsichter-usw in Die Starke by H. Rumpf et al., June 1952, pages 162–165.